(12) United States Patent
Edwards et al.

(10) Patent No.: US 7,554,966 B2
(45) Date of Patent: Jun. 30, 2009

(54) METHOD FOR COMBINING MULTIPLE FRAMES OF DATA INTO A SINGLE MEDIUM ACCESS

(75) Inventors: Bruce E. Edwards, Belmont, MA (US); Matthew J. Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 346 days.

(21) Appl. No.: 11/137,689

(22) Filed: May 25, 2005

(65) Prior Publication Data

US 2005/0265303 A1    Dec. 1, 2005

Related U.S. Application Data

(60) Provisional application No. 60/574,109, filed on May 25, 2004.

(51) Int. Cl.
*H04L 12/56* (2006.01)
(52) U.S. Cl. ........................ 370/349; 370/329; 370/338
(58) Field of Classification Search ................. 370/329, 370/349, 235, 464, 465, 468, 470, 505; 455/414.2, 455/451
See application file for complete search history.

(56) References Cited

U.S. PATENT DOCUMENTS

2005/0018638 A1 * 1/2005 Lindskog et al. ............ 370/338
2005/0190724 A1 * 9/2005 Hansen et al. .............. 370/329

FOREIGN PATENT DOCUMENTS

WO    WO-03/048913 A1 *   6/2003

* cited by examiner

*Primary Examiner*—David Q Nguyen
(74) *Attorney, Agent, or Firm*—McAndrews, Held & Malloy, Ltd.

(57) ABSTRACT

A method of combining multiple frames of data into a single access to a shared communications medium improves network efficiency transmitting in a fashion compatible with legacy network equipment. An increase in the efficiency of use of a shared communications medium is realized by amortizing the overhead of fixed elements of a communication protocol over multiple frames. The sharing of preamble signaling, elimination of multiple inter-frame gaps or spaces, and the use of a legacy signal field permits a representative embodiment of the present invention to more effectively use a shared communication medium, while in addition providing backward compatible support for legacy network stations.

23 Claims, 7 Drawing Sheets

METHOD FOR COMBINING MULTIPLE FRAMES OF DATA INTO A SINGLE MEDIUM ACCESS

RELATED APPLICATIONS

The present application makes reference to, claims priority to, and claims benefit of U.S. Provisional Patent Application Ser. No. 60/574,109, entitled "A Method For Combining Multiple Frames Of Data Into A Single Medium Access", filed May 25, 2004, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Transfer of data over a network medium is typically accomplished as a sequence of frames. The format of these frames over a physical medium usually comprises a series of a preamble field, an optional frame specification field, a payload or data field, and an inter-frame gap. Each of the fields of the frame format has a particular purpose. The preamble may be used to synchronize the transmitter and receiver. An optional frame specification may convey information such as the coding method or length of the frame, and to reserve the medium. The inter-frame gap or space may be used to allow for propagation and receiver processing delays. The inter-frame gap may also be included to allow for transmitter initialization and processing delays when the transmitted frame may result in a transmitted response from the recipient.

In various protocols, some fields of a frame format may be required, and may be transmitted at a fixed data transmission rate, to enable all receivers to be able to receive network information related to occupancy of the shared medium. Those fields may, therefore, occupy a fixed amount (i.e., fixed time period) of the shared transmission medium, despite increases in the rate of transmission of other portions. Efforts to increase the rate of data transfer are hampered by such fixed duration protocol elements. As the frame data transmission rate increases, the time taken to transmit the payload or data fields shrinks, while the time occupied by the fixed rate fields does not. This causes the medium usage efficiency to fall, yielding diminishing returns from increasing data transmission rates.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

A system and/or method for communicating multiple frames of data in a single medium access, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the exchange of frames of digital information using a shared medium. More specifically, certain aspects of the present invention pertain to a method of formatting frames of data for transmission via a shared media in a manner compatible with legacy data receivers. Although details of aspects of the present invention are provided below with respect to a particular wireless communication protocol, a representative embodiment of the present invention is not limited to use with the exemplary protocol standard, and may have application with regard to other communication techniques, protocols, and media, without departing from the spirit or scope of the present invention.

Figure 1A:
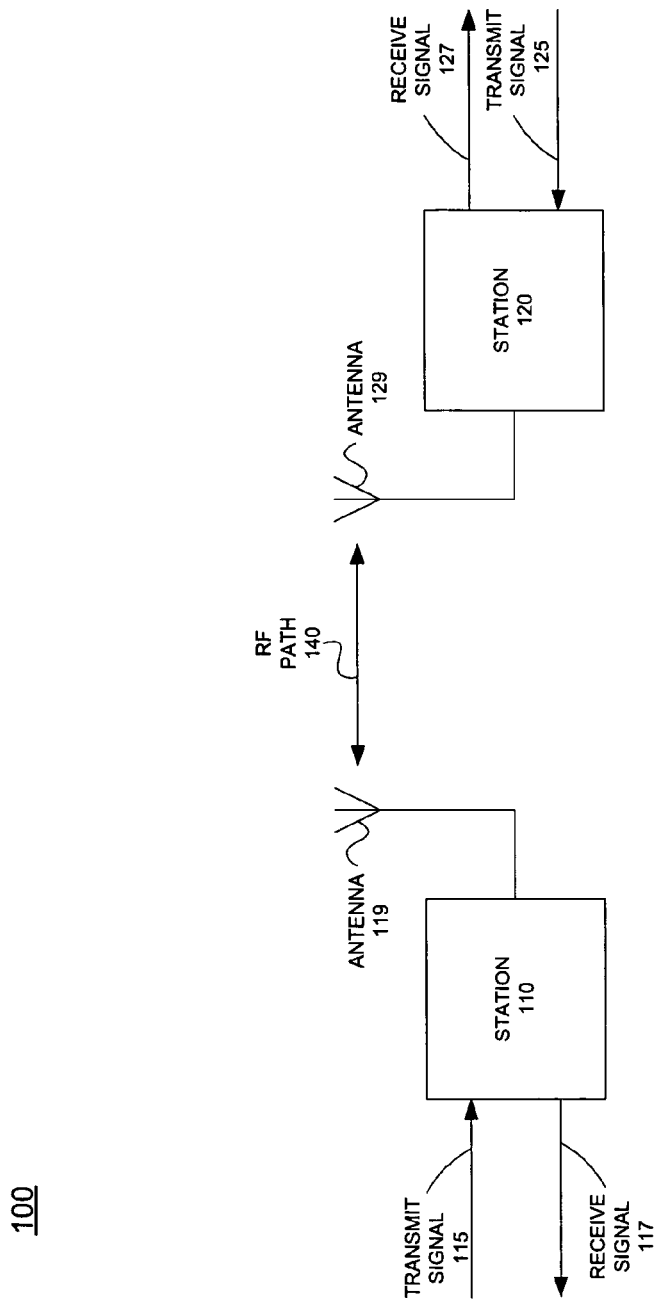
FIG. 1A shows a block diagram of a exemplary wireless data communication system in which a representative embodiment of the present invention may be practiced.

FIG. 1A shows a block diagram of a exemplary wireless data communication system 100 in which a representative embodiment of the present invention may be practiced. The illustration of FIG. 1A shows two stations 110, 120 in radio frequency (RF) communication via antennas 119, 129 and shared radio frequency (RF) communications medium 140. It is a function of each of stations 110, 120 to convert transmit signals 115, 125 to RF signals to be received by the other of the stations 110, 120, and to convert received RF signals to receive signals 117, 127. Although only two stations are shown in FIG. 1A, this is for reasons of clarity, and does not represent a specific limitation of the present invention. In addition, although the antennas 119, 129 are each shown as a single antenna coupled to the respective stations 110, 120, each of the antennas 119, 120 may comprise two or more antennas, or antennas having multiple elements, without departing from the spirit or scope of the present invention. In various representative embodiments of the present invention, multiple antennas may be used for each of the antennas 119, 120 to support, for example, diversity, beam-forming, or space-time coded systems. In addition, although the discussion herein refers to the use of antennas and RF signals, other wired and wireless communication media may be employed without departing from the spirit and scope of the present invention. The accuracy of the communication of the transmit signal 115 of station 110 to station 120 as receive signal 127, and similarly the transmit signal 125 of station 120 to station 110 as receive signal 117 depends upon a number of factors including, for example, the length of the shared RF communications medium 140 between the stations 110, 120, the power level of the RF signal transmitted by the stations 110, 120, any sources of interference along shared RF communications medium 140, and the gain provided by antennas 119, 129, to name only a few.

In order to communicate data over the shared RF communications medium 140, the stations 110, 120 may employ a data communications protocol. Such a protocol typically packages segments of the data to be communicated into frames. Additional information transmitted as a part of the protocol may be used for medium access control, error control, and control signaling, to name only a few uses.

Figure 1B:
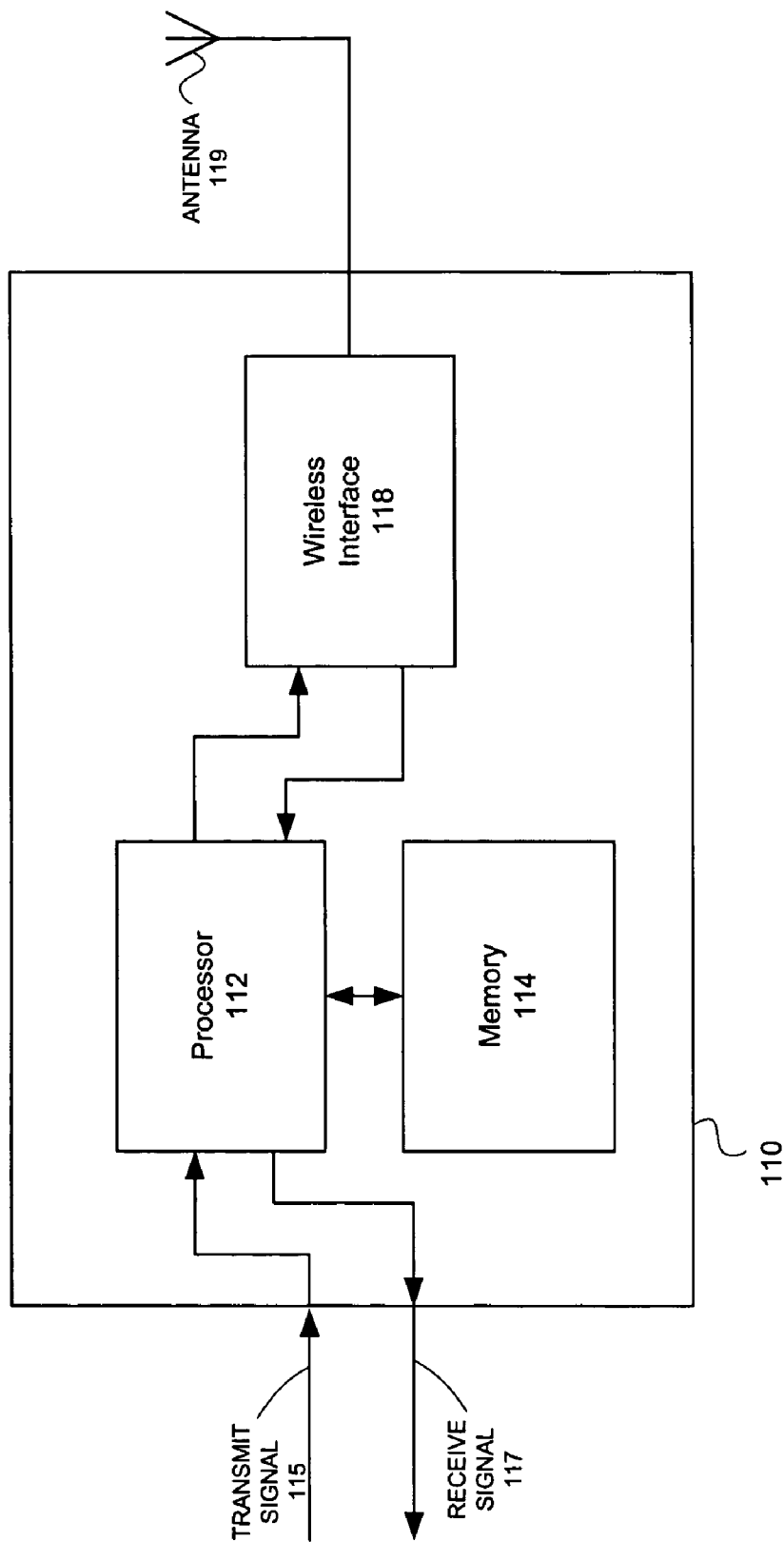
FIG. 1B illustrates additional detail of an exemplary station that may correspond to, for example, the station in the communication system of FIG. 1A, in accordance with a representative embodiment of the present invention.

FIG. 1B illustrates additional detail of an exemplary station 110 that may correspond to, for example, the station 110 in the communication system 100 of FIG. 1A, in accordance with a representative embodiment of the present invention. The station 110 of FIG. 1B comprises a processor 112, a memory 114, and a wireless interface 118. The processor 112 is configured to accept a transmit signal 115 that may correspond to, for example, the transmit signal 115 of FIG. 1A. The processor 112 may comprise, for example, one or more suitable microprocessors and/or digital signal processors in an interconnected arrangement for formatting and/or encoding the transmit signal 115 to be suitable for use by wireless interface 118. In the illustration of FIG. 1A, the suitably formatted and/or encoded signal from processor 112 is passed to the wireless interface 118 to be converted, for example, into a radio frequency signal passed to antenna 119. In one representative embodiment of the present invention, the radio frequency signal passed to antenna 119 may, for example, be compatible with the Institute of Electrical and Electronics Engineers (IEEE) 802.11a standard. The antenna 119 may receive from another station similar to the station 110 a wireless receive signal that may comprise, for example, a radio frequency signal compatible with the IEEE 802.11a standard. Other forms of wireless and wired communication may be employed in other representative embodiments of the present invention.

The received signal from antenna 119 may be converted by the wireless interface 118 into a form usable by the processor 112. The processor 112 may decode and/or re-format the signal passed from the wireless interface 118 to form receive signal 117 that may correspond to, for example, the receive signal 117 of FIG. 1A. The memory 114 may be accessed by the processor 112 to execute program instructions that cause the processor 112 to perform at least the above-described actions. The memory 114 may comprise conventional read-only memory, random access memory (RAM), FLASH memory, and/or other forms of memory for storing and reading data and instructions used in the operation of processor 112.

Figure 2:
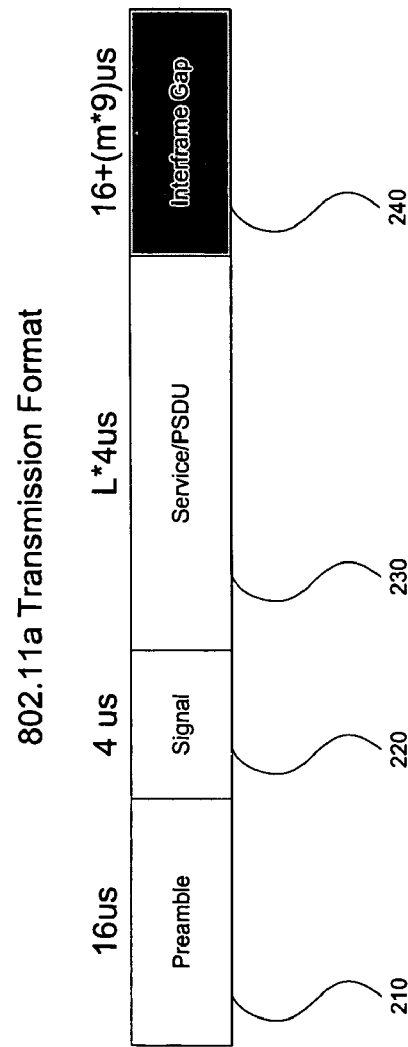
FIG. 2 illustrates the fields in an exemplary protocol frame format for use with a shared medium, in accordance with a representative embodiment of the present invention.

FIG. 2 illustrates the fields in an exemplary protocol frame format 200 for use with a shared medium, in accordance with a representative embodiment of the present invention. The protocol frame format 200 is similar to that of the Institute of Electrical and Electronics Engineers, Inc. (IEEE) 802.11a wireless data protocol, and may correspond, for example, to the format used for the transmit signals 115, 127 and receive signals 117, 125 shown in FIG. 1A. In order to provide an illustrative example, the following discussion of aspects of the present invention makes reference to elements of the IEEE 802.11a physical format. The technique described below may be of use in IEEE 802.11a/b/g/n networks, but may also have application in other applications where the frames of a communication protocol have the same basic structure as that described and shown herein. The protocol frame format 200 is therefore shown for illustrative purposes only, as other protocols for use over a shared communication medium exist, including those for wired communications media. A representative embodiment of the present invention is not limited to use with a wireless communications medium, and may be applied to other communications media without departing from the spirit and scope of the present invention.

The IEEE 802.11a PLCP protocol data unit (PPDU) consists of a PLCP (physical layer convergence protocol) header, which carries information about the method of transmission, followed by the frame (referred to as a PLCP Service Data Unit (PSDU)) itself. The PLCP header includes information about the encoding method, the length and initialization information for the receiver. The encoding and length information are contained in the Signal field 220 of the PLCP header, and the initialization information is contained in the Service field 230 of the PLCP header. The PPDU is transmitted by obtaining access to the communication medium and then transmitting the sequence of bits referred to as the Preamble field 210. The Preamble field 210 of FIG. 2 is followed by a single symbol, which encodes the Signal field 220 of the PLCP header. This symbol is transmitted in a specific robust encoding format. The Signal field 220 symbol is followed by a sequence of symbols that encode the Service field 230 of the PLCP and the PSDU 230.

Because the wireless medium is a shared medium, all stations will attempt to decode all transmitted frames. Each station uses the Preamble field 210 to synchronize their data recovery circuits and to determine the channel characteristics between the transmitter and the station. The receiving stations decode the Signal field 220 symbol and use it to determine the time duration of the transmission to follow. In 802.11a, the stations use detection of the Preamble 210 and information decoded from the Signal field 220 to determine when the shared communication medium 140 may be available for their own transmissions.

The protocol frame format 200 illustrated in FIG. 2 comprises a number of portions or fields described above to support the use of the communication medium including the Preamble field 210, the Signal field 220, a Service/PSDU field 230, and an Inter-frame Gap 240, sometimes referred to as an inter-frame space. Although the Inter-frame Gap portion 240 may not contain data, it may be employed by the stations 110, 120 during communication via the shared communication medium. In order for the communication medium to be shared by a variety of stations 110, 120, portions of the protocol frame format 200 may be transmitted at a predefined rate. For example, in FIG. 2, the Preamble 210, Signal 220, and Inter-frame Gap fields 240 are predefined and may be timed to a fixed duration so as to be receivable by a variety of receivers. These fields may therefore be of a fixed duration. Other portions or fields of the protocol frame format 200 such as, for example, the Service/Physical Layer Convergence Protocol Service Data Unit (PSDU) field 230 that may be used to carry payload or data, may be transmitted at a different data rate depending upon the capabilities of the intended recipient. Through the use of a predefined format and data rate for certain protocol frame elements or fields, all stations 110, 120 in the wireless data communication system 100 may be aware of details of the operation of the shared communication medium to permit them to access and utilize the communication medium.

Because certain elements or fields, more specifically the Preamble 210, Signal 220, and Inter-frame Gap fields 240 of the protocol frame format 200 are of fixed durations, attempts to increase the throughput of the communications medium are hampered. As the data transmission rate over the shared communication medium 140 increases, the Service/PSDU field 230 information, for example, shrinks in duration, while the time for the Preamble field 210, Signal field 220, and Inter-frame Gap portion 240 remains the same. This results in a reduction in protocol efficiency as the data rate used for the Service/PSDU field 230 increases.

In order to increase the throughput of a network using a protocol frame such as that shown as protocol frame format 200 of FIG. 2, it is desirable to amortize the overhead of the Preamble field 210 and Inter-frame Gap portion 240 over as many transmitted frames as possible. When the transmission medium is very busy, or the transmitted data rates are high, a station operating in accordance with a representative embodiment of the present invention may accumulate a number of frames before it obtains access to the medium. When this occurs, a new transmission format in accordance with a representative embodiment of the present invention may be used to increase network efficiency.

Figure 3:
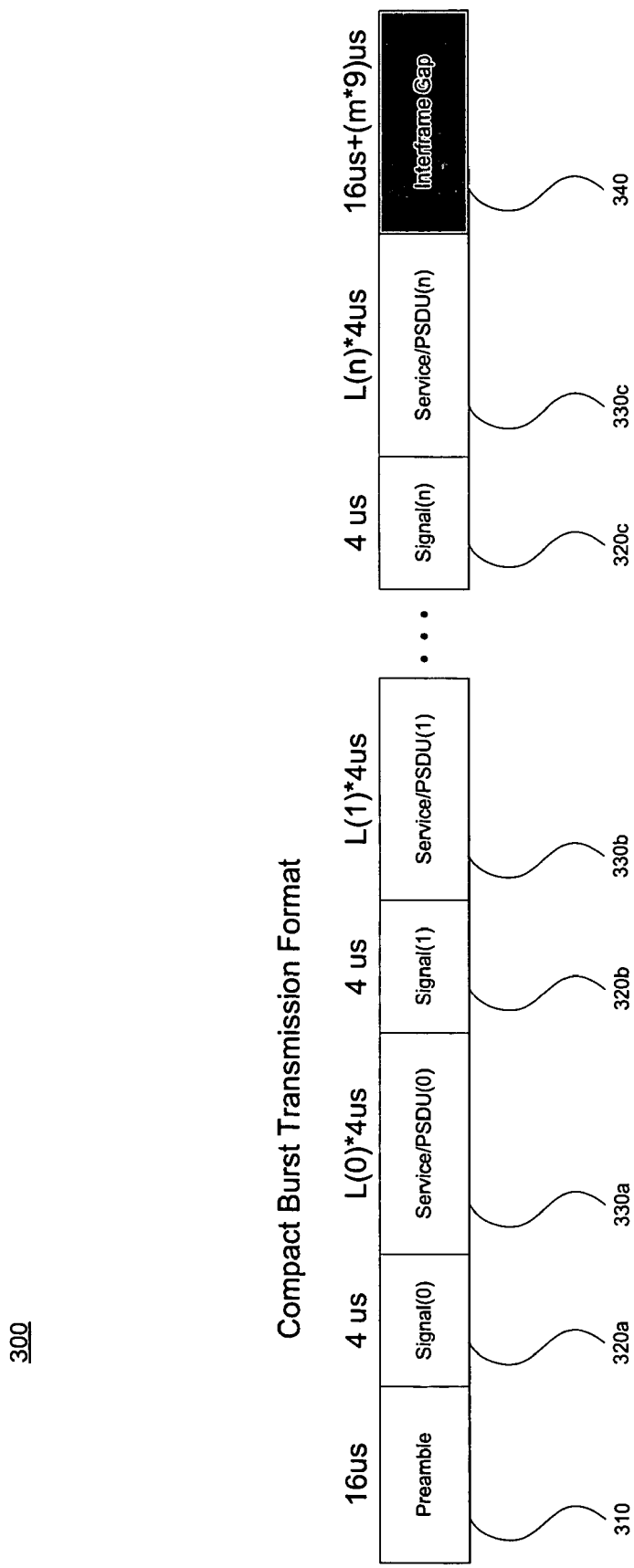
FIG. 3 illustrates an exemplary compact burst transmission format, in accordance with a representative embodiment of the present invention.

FIG. 3 illustrates an exemplary compact burst transmission format 300, in accordance with a representative embodiment of the present invention. As shown in FIG. 3, a compact burst transmission format 300 in accordance with a representative embodiment of the present invention may comprise a single Preamble field 310, multiple Signal and Service/PSDU field pairs (320a, 330a), (320b, 330b), (320c, 330c), and a single Inter-frame Gap 340. All Signal fields 320a, 320b, 320c in the compact burst transmission format 300 may be transmitted in the most robust transmission format and rate. This makes it highly likely that the information in the Signal fields 320a, 320b, 320c will be received correctly by all stations capable of receiving the transmissions from the station 110, 120 that is currently transmitting. In the compact burst transmission format 300 of FIG. 3, each Service/PSDU field 330a, 330b, 330c may be encoded differently to achieve minimum transmission time and acceptable error rates at the intended receiving station 110, 120. All stations 110,120 may attempt to decode the entire compact burst transmission. However, due to random transmission errors, varying signal strength, and varying encoding formats, a given station 110,120 may not receive certain Service/PSDU 330a, 330b, 330c correctly. The incorrect reception of a single Service/PSDU 330a, 330b, 330c in the burst, however, does not affect the ability of that station to receive the next Signal and Service/PSDU pair in the burst. This is due to the robustness of the format and rate used for the transmission of the Signal fields 320a, 320b, 320c, and the fact that the time duration of each of the respective Service/PSDU 330a, 330b, 330c may be determined from the rate and length fields of the associated Signal fields 320a, 320b, 320c. In a representative embodiment of the present invention, a station such as, for example, the stations 110, 120 may use rate and length information in a Signal field like the Signal fields 320a, 320b, 320c, for example, to determine the time at which a next Signal field may arrive, or when the Interframe Gap may begin, whether or not the station is able to correctly receive the Service/PSDU that follows a particular Service field 320a, 320b, 320c.

In a representative embodiment of the present invention, the Preamble field 310 shown in FIG. 3 may employ a predefined format that may be the same as or different from that used for a Preamble field in a transmission format such as that used for the Preamble field 210 of the IEEE 802.11a transmission format shown in FIG. 2, for example. In some representative embodiments of the present invention, the Signal fields 320a, 320b, 320c of FIG. 3 may employ a predefined format that is the same as or different from that used for a Signal field in a transmission format such as that used for the Signal field 220 of the IEEE 802.11a transmission format shown in FIG. 2, for example. Such a difference in format may comprise the use of a "Reserved bit" in the format defined by IEEE 802.11a, for example. Information in the format of the Preamble field 310 and/or Signal field 320a, 320b, 320c may be employed by a representative embodiment of the present invention to permit a receiver to properly decode such a transmission format.

Figure 4:
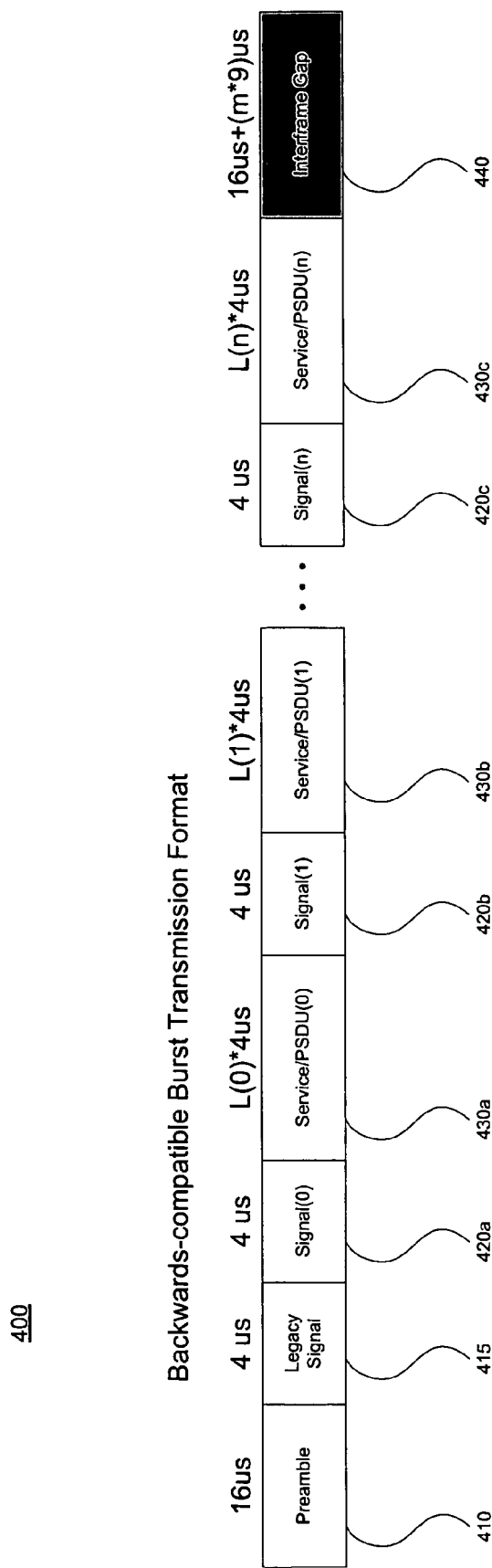
FIG. 4 shows an exemplary backwards-compatible burst transmission format, in accordance with a representative embodiment of the present invention.

FIG. 4 shows an exemplary backwards-compatible burst transmission format 400, in accordance with a representative embodiment of the present invention. In many circumstances, it may be desirable to interoperate with stations 110,120 which do not understand the format of compact bursts such as the compact burst transmission format 300 of FIG. 3. The use of a backwards-compatible burst transmission format, such as the backwards-compatible burst transmission format 400 of FIG. 4, may enable legacy stations to determine the medium usage of transmissions using the compact burst transmission format 300. The backwards-compatible burst transmission format 400 may be identical to the compact burst transmission format 300, with the exception of the addition of a Legacy Signal field 415 added following after the Preamble field 410. The Legacy Signal field 415 may be encoded such that both legacy receivers, and those supporting the compact burst transmission format 300 of FIG. 3 can decode the Legacy Signal field 415. The Legacy Signal field 415 may be adapted to specify the time duration of the entire backwards-compatible burst transmission format 400.

For example, in a representative embodiment of the present invention, the Preamble field 410 shown in FIG. 4 may employ a predefined format that may be the same as or different from that used for a Preamble field in a transmission format such as that used for the Preamble field 310 of FIG. 3, and that used in the Preamble field 210 of the IEEE 802.11a transmission format shown in FIG. 2, for example. In some representative embodiments of the present invention, the Signal fields 420a, 420b, 420c of FIG. 4 may employ a predefined format that is the same as or different from used for a Signal field in a transmission format such as that used for the Signal field 320a, 320b, 320c of FIG. 3, and of the Signal field 220 of the IEEE 802.11a transmission format shown in FIG. 2, for example. Such a difference in format may comprise the use of a "Reserved bit" in the format defined by IEEE 802.11a, for example. Information in the format of the Preamble field 410 and/or Signal field 420a, 420b, 420c may be employed by a representative embodiment of the present invention to permit a receiver to properly decode such a transmission format.

When a backwards-compatible burst in accordance with a representative embodiment of the present invention is received at a legacy station such as, for example the stations 110,120 of FIG. 1A, the Legacy Signal field 415 may be decoded by the receiver portion, and may specify the duration of the entire backwards-compatible burst. The legacy station 110,120 may interpret the backwards-compatible burst 400 as a single large frame, and thus not attempt to use the medium at any time during the backwards-compatible burst 400. After the end of the backwards-compatible burst 400, a legacy station 110,120 may contend for the medium using its normal contention mechanisms.

When a backwards-compatible burst 400 is received at a backwards-compatible burst-capable station 110,120, the backwards-compatible burst-capable station 110,120 may decode the Legacy Signal field 415 and may store the expected burst duration. The backwards-compatible burst-capable station 110, 120 may then continue to decode the Signal and Service/PSDU pairs (420a, 430a), (420b, 430b), 420c, 430c) as in the compact burst example described above with respect to FIG. 3. If any of the Signal fields 420a, 420b, 420c are decoded incorrectly, the station will not contend for the communications medium until the time specified in the Legacy Signal field 415, has elapsed.

A number of mechanisms may be used to indicate burst termination, that is, that the final PSDU of a backwards-compatible burst 400 has been transmitted. In a representative embodiment of the present invention, the termination may be indicated implicitly by the absence of a Signal field 415, or an absence of RF carrier on the shared communication medium 140. The termination may also be indicated as part of the Signal(n) field of the backwards-compatible burst 400, or as a Signal(n+1) field with a zero length (and thus not followed by a Service/PSDU field). Similarly the termination may be indicated as part of the Service/PSDU field 430a, 430b, 430c. In another embodiment of the present invention, the burst duration of the backwards-compatible burst 400 may be specified in the Legacy Signal field 415, to indicate when the end of the burst has been reached.

Figure 5:
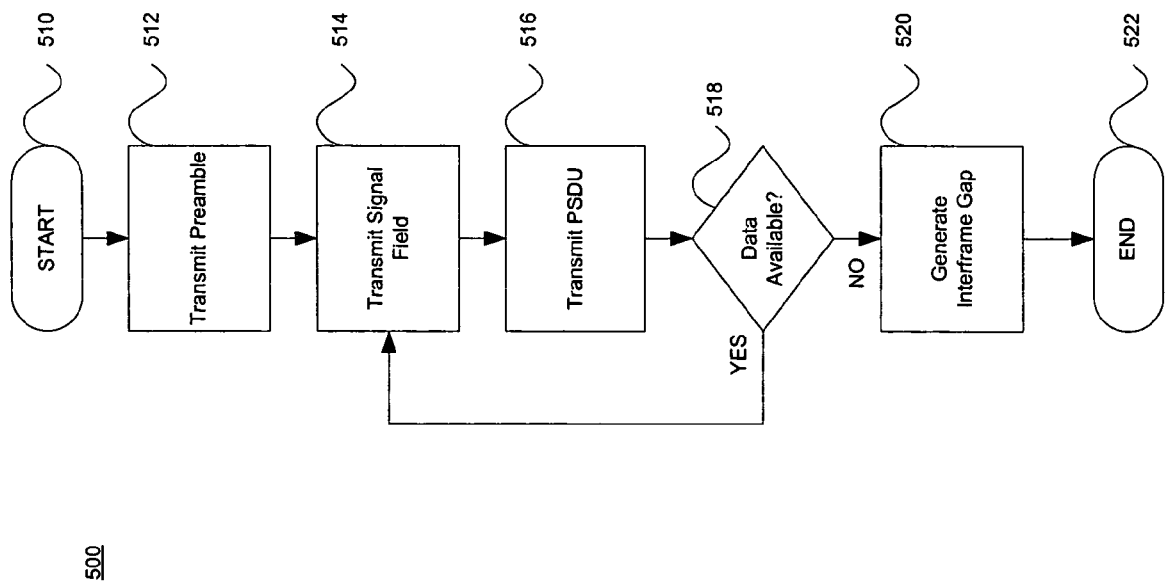
FIG. 5 shows a flowchart illustrating an exemplary method of transmitting multiple frames of data in a single medium access using a compact burst format, in accordance with a representative embodiment of the present invention.

FIG. 5 shows a flowchart 500 illustrating an exemplary method of transmitting multiple frames of data in a single medium access using a compact burst format, in accordance with a representative embodiment of the present invention. The format of this transmission may, for example, correspond to the format of the backward-compatible burst format shown in FIG. 4. In the illustration of FIG. 5, the method begins at state 510 following a decision by a station such as, for example, stations 110,120 to transmit data using a shared communication medium such as, for example, the shared RF communication medium 140 of FIG. 1A. Such a station may begin by transmitting the preamble of the protocol frame (512). Next, the station 110, 120 may transmit a Signal field such as, for example, the Signal field 320a of FIG. 3, that is appropriate for the next PSDU (514). The station 110, 120 may follow the Signal field 320a with, for example, the data of a PSDU such as, for example, the PSDU 330a (516). Following completion of the transmission of the PSDU of data, a check may be made to determine whether additional data is to be transmitted (518). If more data is available, the station 110, 120 may transmit an appropriate Signal field for the next PSDU (e.g., PSDU 320b of FIG. 3) (514), and the next PSDU is transmitted (516). This process repeats until the data for all PSDUs is sent (518), at which time the station 110, 120 relinquishes the shared communication medium for the duration of the Inter-frame Gap (520). The process of transmitting the multiple frames of data then ends (522). Although not shown, the method of FIG. 5 may also include a detection of the occupancy of the shared communications medium before the transmission begins.

Figure 6:
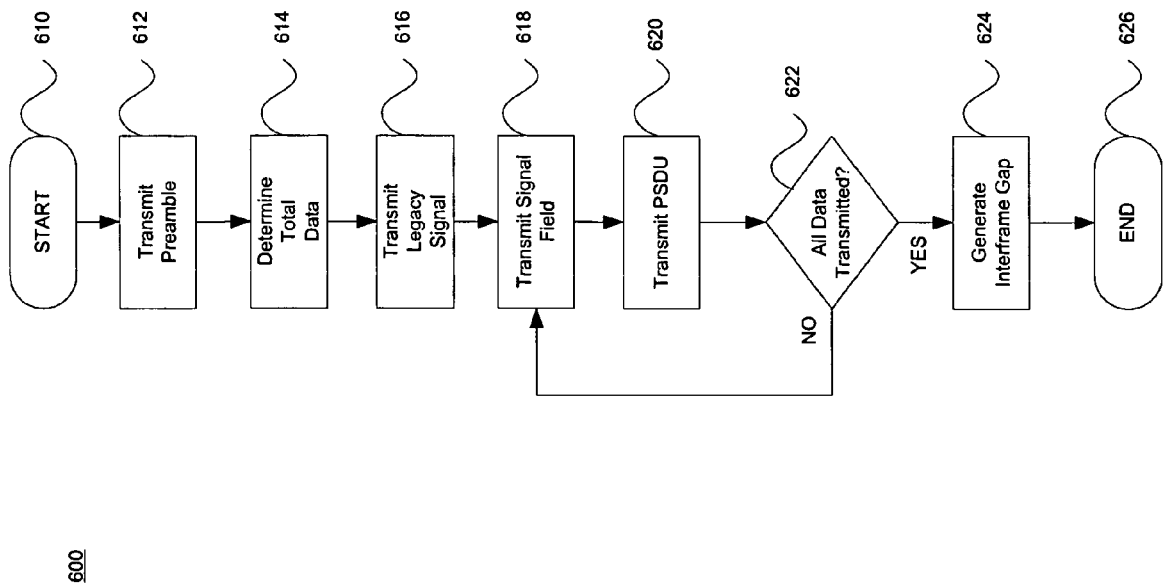
FIG. 6 shows a flowchart illustrating an exemplary method of transmitting multiple frames of data in a single medium access using a backward compatible burst format, in accordance with a representative embodiment of the present invention.

FIG. 6 shows a flowchart 600 illustrating an exemplary method of transmitting multiple frames of data in a single medium access using a backward compatible burst format, in accordance with a representative embodiment of the present invention. The format of this transmission may, for example, correspond to the format of the backward-compatible burst format shown in FIG. 4. As shown in the illustration of FIG. 6, the method begins at state 610 following a decision by a station such as, for example, stations 110,120 to transmit data using a shared communication medium such as, for example, the shared RF communications medium 140 of FIG. 1A. In a representative embodiment of the present invention, the station 110,120 may begin transmission on the shared medium by transmitting the preamble (e.g., preamble 410) of the protocol frame (612). The station 110, 120 may then determine the total amount of data to be transmitted during this burst (614). The determination of the total amount of data to be transmitted enables the station to properly code a Legacy Signal field such as, for example, the Legacy Signal field 415 of FIG. 4 that may be transmitted (616) to communicate the entire duration of the occupancy of the shared communications medium by the burst. In another representative embodiment in accordance with the present invention, the determination of the duration of occupancy of the shared medium may be performed before the transmission of the preamble (e.g., preamble 410), or the two activities may occur concurrently. Next, the station 110, 120 may transmit a Signal field (e.g., 420b) appropriate for the next PSDU to be sent (618). The station may then follow the Signal field 420b with the data of the PSDU (e.g., 430b) (620). Following completion of the transmission of the PSDU of data, a check is made to determine whether all data has been transmitted (622). If more data is available, the station 110, 120 may transmit an appropriate Signal field for the next PSDU (e.g., 420c) (618), and the next PSDU may then be transmitted (e.g., 430c) (620). The process of transmitting successive pairs of Signal fields and PSDUs repeats until testing shows that data for all PSDUs has been sent (622), at which time the station 110, 120 relinquishes the shared communication medium for at least the duration of the Inter-frame Gap (624). Although sometime referred to herein as "generating", the Inter-frame Gap may comprise a silent period during which a station does not transmit. The process of transmitting the multiple frames of data then ends (626). Although not shown, the method of FIG. 6 may also include a detection of the occupancy of the shared communications medium before the transmission begins.

Aspects of the present invention may be seen in a method of communicating a plurality of data frames using a single communication medium access in a network comprising entities of at least a first type and a second type. Such a method may comprise, when communicating to an entity of the first type, (a) transmitting preamble information, (b) transmitting a first information portion comprising a representation of a duration of transmission of one of the plurality of data frames, and (c) transmitting the one of the plurality of data frames. The method may also comprise (d) generating an inter-frame gap, and (e) repeating (a) through (d) until all of the plurality of data frames have been transmitted. The method may comprise, when communicating to an entity of the second type, (f) transmitting preamble information, (g) transmitting a second information portion comprising a representation of a duration of transmission of one of the plurality of data frames, and (h) transmitting the one of the plurality of data frames. The method may comprise (i) repeating (g) through (h) until all of the plurality of data frames have been transmitted in an essentially continuous transmission, and (j) generating an inter-frame gap.

In a representative embodiment of the present invention, when communicating to an entity of the second type the method may also comprise transmitting a legacy information portion subsequent to transmitting the preamble information and prior to transmitting the second information portion. The legacy information portion may be compatible with network entities of the first type and may comprise information representative of a total duration of transmission of the plurality of data frames. The legacy information portion may cause network entities of the first type to refrain from transmitting for at least the total duration of transmission of the plurality of data frames. The legacy information portion may comprise information representing a transmission rate and information representing a length of data to be transmitted. The medium may be a wireless communication medium. The entity of the first type may be compliant with the Institute of Electrical and Electronics Engineers (IEEE) 802.11a standard. A representative embodiment in accordance with the present invention may also comprise detecting occupancy of the communication medium, prior to transmitting preamble information, and may comprise determining an expected duration of occupancy of the communication medium. A representative embodiment in accordance with the present invention may also comprise refraining from transmitting for the expected duration of occupancy. Generating the inter-frame gap may comprise refraining from transmitting.

Other aspects of the present invention may be observed in a communication device supporting the combining of multiple data frames into a single medium access in a network comprising network entities of a first type and a second type. Such a device may comprise a processor communicatively coupled to a memory comprising executable instructions, and to a communication interface compatible with the medium. The device may communicate the multiple data frames to a network entity of the first type using multiple medium accesses. Each access may comprise a preamble portion, a data portion corresponding to one of the multiple data frames, and an inter-frame gap portion. The device may communicate the multiple data frames to a network entity of the second type using a single medium access comprising a preamble portion, multiple data portions corresponding to the multiple data frames, and an inter-frame gap portion.

In a representative embodiment of the present invention, the single medium access may comprise an information portion comprising a representation of total medium occupancy for communicating the multiple data frames. The medium may be a wireless communication medium, and the first type of network entity may be compliant with one of: the Institute of Electrical and Electronics Engineers (IEEE) 802.11a (1999) standard and the Institute of Electrical and Electronics Engineers (IEEE) 802.11g (2003) standard. The processor may be capable of detecting occupancy of the communication medium, may be capable of determining an expected duration of occupancy of the communication medium, and may be capable of refraining from transmitting for the expected duration of occupancy. The inter-frame gap portion may comprise a period of time during which the wireless interface does not transmit.

Yet other aspects of the present invention may be found in a machine-readable storage, having stored thereon a computer program having a plurality of code sections executable by a machine for causing the machine to perform the operations described above.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a transmitter of a communication device for communicating a plurality of data frames using a single access to a shared communication medium in a network comprising communication devices each having a receiver of one of at least a first type and a second type, the method comprising:
when the transmitter is communicating to a communication device having a receiver of the first type:
(a) transmitting preamble information;
(b) after transmitting the preamble information, transmitting a first information portion comprising a representation of a duration of transmission of one of the plurality of data frames;
(c) after transmitting the first information portion, transmitting the one of the plurality of data frames;
(d) after transmitting the one of the plurality of data frames, generating an inter-frame gap; and
(e) repeating (a) through (d) until all of the plurality of data frames have been transmitted; and
when the transmitter is communicating to a communication device having a receiver of the second type:
(f) transmitting preamble information;
(g) after transmitting the preamble information, transmitting a second information portion comprising a representation of a duration of transmission of one of the plurality of data frames;
(h) after transmitting the second information portion, transmitting the one of the plurality of data frames;
(i) repeating (g) through (h) without use of the shared communication medium by another transmitting entity, until all of the plurality of data frames have been transmitted in an essentially continuous transmission; and
(j) after all of the plurality of data frames have been transmitted, generating an inter-frame gap.

2. The method according to claim 1, wherein when communicating to the communication device having a receiver of the second type the method comprises:
transmitting a legacy information portion subsequent to transmitting the preamble information and prior to transmitting the second information portion, the legacy information portion compatible with the communication device having a receiver of the first type and comprising information representative of a total duration of transmission of the plurality of data frames, the legacy information portion causing the communication device having a receiver of the first type to refrain from transmitting for at least the total duration of transmission of the plurality of data frames.

3. The method according to claim 2, wherein the legacy information portion comprises information representing a transmission rate and information representing a length of data to be transmitted.

4. The method according to claim 1 wherein the shared communication medium is a wireless communication medium.

5. The method according to claim 1 wherein the communication device having a receiver of the first type is compliant with the Institute of Electrical and Electronics Engineers (IEEE) 802.11a standard.

6. The method according to claim 1, comprising: detecting occupancy of the communication medium, prior to transmitting preamble information.

7. The method according to claim 1, comprising: determining an expected duration of occupancy of the shared communication medium; and
refraining from transmitting for the expected duration of occupancy.

8. The method according to claim 1 wherein generating the inter-frame gap comprises refraining from transmitting.

9. A communication device supporting the combining of multiple data frames into a single access to a shared communication medium in a network comprising network entities of a first type and a second type, the device comprising:
a processor communicatively coupled to a memory comprising executable instructions, and to a communication interface compatible with the shared communication medium;
wherein the device communicates the multiple data frames to a network entity of the first type using multiple accesses to the shared communication medium, each access comprising, in order, a preamble portion, a data portion corresponding to one of the multiple data frames, and an inter-frame gap portion; and
wherein the device communicates the multiple data frames to a network entity of the second type using a single access to the shared communication medium comprising, in order, a preamble portion, multiple data portions corresponding to the multiple data frames, and an inter-frame gap portion.

10. The device according to claim 9 wherein the single medium access comprises an information portion comprising a representation of total medium occupancy for communicating the multiple data frames.

11. The device according to claim 9 wherein the shared communication medium is a wireless communication medium.

12. The device according to claim 9 wherein the first type of network entity is compliant with one of: the Institute of Electrical and Electronics Engineers (IEEE) 802.11a (1999) standard and the Institute of Electrical and Electronics Engineers (IEEE) 802.11g (2003) standard.

13. The device according to claim 9, wherein the processor is capable of detecting occupancy of the shared communication medium.

14. The device according to claim 9, wherein the processor is capable of:
determining an expected duration of occupancy of the shared communication medium; and
refraining from transmitting for the expected duration of occupancy.

15. The device according to claim 9 wherein the inter-frame gap portion comprises a period of time during which the wireless interface does not transmit.

16. A machine-readable storage, having stored thereon a computer program having a plurality of code sections for operating a transmitter of a communication device for communicating a plurality of data frames using a single access to a shared communication medium in a network comprising communication devices each having a receiver of one of at least a first type and a second type, the code sections executable by a machine for causing the machine to perform the operations comprising:
when the transmitter is communicating to a communication device having a receiver of the first type:
(a) transmitting preamble information;
(b) after transmitting the preamble information, transmitting a first information portion comprising a representation of a duration of transmission of one of the plurality of data frames;
(c) after transmitting the first information portion, transmitting the one of the plurality of data frames;
(d) after transmitting the one of the plurality of data frames, generating an inter-frame gap; and
(e) repeating (a) through (d) until all of the plurality of data frames have been transmitted; and
when the transmitter is communicating to a communication device having a receiver of the second type:
(f) transmitting preamble information;
(g) after transmitting the preamble information, transmitting a second information portion comprising a representation of a duration of transmission of one of the plurality of data frames;
(h) after transmitting the second information portion, transmitting the one of the plurality of data frames;
(i) repeating (g) through (h) without use of the shared communication medium by another transmitting entity, until all of the plurality of data frames have been transmitted in an essentially continuous transmission; and
(j) after all of the plurality of data frames have been transmitted, generating an inter-frame gap.

17. The machine-readable storage according to claim 16, wherein when communicating to the communication device having a receiver of the second type, the code sections executable by a machine further cause the machine to perform the operations comprising:
transmitting a legacy information portion subsequent to transmitting the preamble information and prior to transmitting the second information portion, the legacy information portion compatible with the communication device having a receiver of the first type and comprising information representative of a total duration of transmission of the plurality of data frames, the legacy information portion causing the communication device having a receiver of the first type to refrain from transmitting for at least the total duration of transmission of the plurality of data frames.

18. The machine-readable storage according to claim 16, wherein the legacy information portion comprises information representing a transmission rate and information representing a length of data to be transmitted.

19. The machine-readable storage according to claim 16 wherein the shared communication medium is a wireless communication medium.

20. The machine-readable storage according to claim 16 wherein the communication device having a receiver of the first type is compliant with the Institute of Electrical and Electronics Engineers (IEEE) 802.11a standard.

21. The machine-readable storage according to claim 16, wherein the code sections executable by a machine cause the machine to perform the operations comprising:
   detecting occupancy of the shared communication medium.

22. The machine-readable storage according to claim 16, wherein the code sections executable by a machine cause the machine to perform the operations comprising:
   determining an expected duration of occupancy of the shared communication medium; and
   refraining from transmitting for the expected duration of occupancy.

23. The machine-readable storage according to claim 16 wherein generating the inter-frame gap comprises refraining from transmitting.

* * * * *